United States Patent
Morisaku et al.

(10) Patent No.: US 10,003,050 B2
(45) Date of Patent: Jun. 19, 2018

(54) BATTERY MODULE WITH HEAT TRANSFER PLATE ENGAGEMENT SECTION

(71) Applicant: KABUSHIKI KAISHA TOYOTA JIDOSHOKKI, Aichi-ken (JP)

(72) Inventors: Naoto Morisaku, Kariya (JP); Takayuki Kato, Kariya (JP); Shintaro Watanabe, Kariya (JP); Hidefumi Oishi, Kariya (JP); Takashi Sakai, Kariya (JP); Yuki Chujo, Kariya (JP); Hiromi Ueda, Kariya (JP); Kazuki Maeda, Kariya (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 94 days.

(21) Appl. No.: 14/760,411

(22) PCT Filed: Jan. 24, 2014

(86) PCT No.: PCT/JP2014/051512
§ 371 (c)(1),
(2) Date: Jul. 10, 2015

(87) PCT Pub. No.: WO2014/115842
PCT Pub. Date: Jul. 31, 2014

(65) Prior Publication Data
US 2015/0357616 A1    Dec. 10, 2015

(30) Foreign Application Priority Data
Jan. 25, 2013 (JP) .................................. 2013-012467

(51) Int. Cl.
*H01M 2/10* (2006.01)
*H01M 10/625* (2014.01)
(Continued)

(52) U.S. Cl.
CPC ....... *H01M 2/1077* (2013.01); *H01M 10/613* (2015.04); *H01M 10/625* (2015.04); *H01M 10/6554* (2015.04); *H01M 2220/20* (2013.01)

(58) Field of Classification Search
CPC ............. H01M 2/1077; H01M 10/625; H01M 10/613; H01M 10/6554; H01M 2220/20; H01M 2/1083; H01M 10/6555
See application file for complete search history.

(56) References Cited

U.S. PATENT DOCUMENTS 5,756,227 A * 5/1998 Suzuki ....................... F28F 3/02
                                                                 429/120
8,507,121 B2    8/2013 Saito et al.
(Continued)

FOREIGN PATENT DOCUMENTS

JP    8-148187     6/1996
JP    2011-23179   2/2011
(Continued)

OTHER PUBLICATIONS

International Search Report for PCT/JP2014/051512 dated Apr. 15, 2014, along with English-language translation.
(Continued)

*Primary Examiner* — Michael L Dignan
(74) *Attorney, Agent, or Firm* — Greenblum & Bernstein, P.L.C.

(57) ABSTRACT

A battery module includes a battery cell, a heat transfer plate, and a holder. The heat transfer plate is arranged side by side with the battery cell and has an edge and is thermally coupled to the battery cell. The holder holds the battery cell and that has a cutout section to which the heat transfer plate is fitted. The edge of the heat-transmitting plate has a first engagement section that is at least one of a first recess and a first protrusion. The holder has a second engagement section that is at least one of a second protrusion, which is
(Continued)

fitted to the first recess and a second protrusions, which is fitted to the first protrusion.

8 Claims, 5 Drawing Sheets

(51) Int. Cl.
  *H01M 10/6554* (2014.01)
  *H01M 10/613* (2014.01)

(56) References Cited

U.S. PATENT DOCUMENTS

| | | | | |
|---|---|---|---|---|
| 9,481,556 | B2* | 11/2016 | Oishi | H01M 2/1083 |
| 2009/0283346 | A1* | 11/2009 | Katae | B60K 1/04 |
| | | | | 180/68.2 |
| 2010/0304203 | A1* | 12/2010 | Buck | H01M 2/1072 |
| | | | | 429/120 |
| 2011/0293982 | A1* | 12/2011 | Martz | H01M 10/613 |
| | | | | 429/120 |
| 2012/0094165 | A1* | 4/2012 | Valencia, Jr. | H01M 10/0525 |
| | | | | 429/120 |
| 2014/0087231 | A1* | 3/2014 | Schaefer | H01M 10/5053 |
| | | | | 429/120 |

FOREIGN PATENT DOCUMENTS

| | | | | |
|---|---|---|---|---|
| JP | 2011-23180 | | 2/2011 | |
| JP | 2011-49014 | | 3/2011 | |
| JP | 2011-96478 | | 5/2011 | |
| WO | WO 2012/013789 | * | 2/2012 | H01M 10/50 |
| WO | WO 2012/123065 | * | 9/2012 | H01M 2/10 |

OTHER PUBLICATIONS

Written Opinion of the International Search Authority for PCT/JP2014/051512 dated Apr. 15, 2014 (English-language translation only).
International Preliminary Report on Patentability for PCT/JP2014/051512 dated Jul. 28, 2015 (English-language translation.

* cited by examiner

Fig.7A
Fig.7B
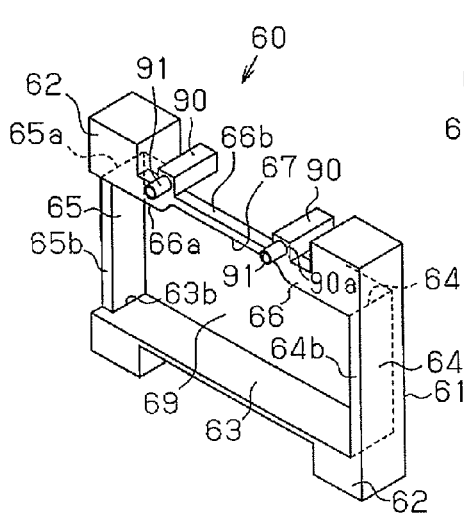
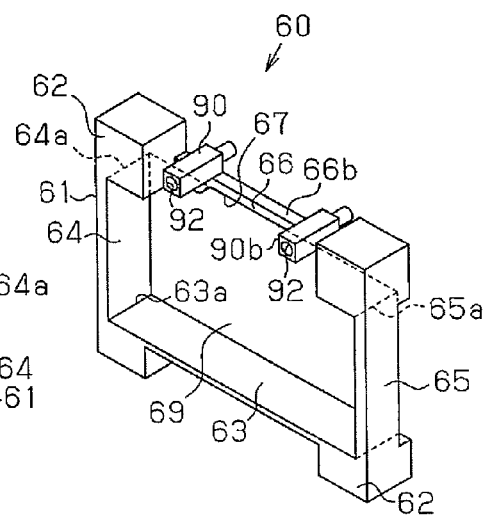
Fig.8
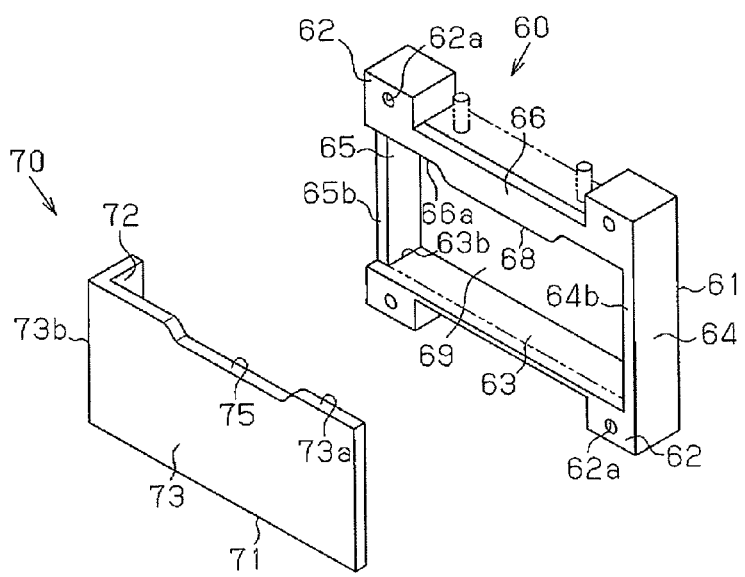

US 10,003,050 B2

BATTERY MODULE WITH HEAT TRANSFER PLATE ENGAGEMENT SECTION

TECHNICAL FIELD

The present invention relates to a battery module that includes battery cells and heat transfer plates that are arranged side by side.

BACKGROUND ART

Patent Document 1 describes a battery assembly, which is an example of a battery module that dissipates the heat of battery cells with heat transfer plates.

In the battery assembly of Patent Document 1, electric cells are arranged in series. Heat transfer plates are sandwiched between adjacent ones of the electric cells. Each heat transfer plate has the shape of the letter L as viewed from above and includes a first heat exchange surface portion, which is sandwiched between the adjacent electric cells, and a second heat exchange surface portion, which is located on the outer side of an end of the electric cell and in contact with a side surface of the electric cell.

PRIOR ART DOCUMENTS

Patent Documents

Patent Document 1: Japanese Laid-Open Patent Publication No. 8-148187

SUMMARY OF THE INVENTION

Problems that the Invention is to Solve

When the battery assembly receives vibrations, the heat transfer plates may be displaced. For example, the second heat exchange surface portion may be displaced away from the side surface of the electric cell, and the heat transfer plate may escape from between the electric cells.

It is an objective of the present invention to provide a battery module that limits displacement of a heat transfer plate.

Means for Solving the Problems

To achieve the foregoing objective and in accordance with one aspect of the present invention, a battery module is provided that includes a battery cell, a heat transfer plate, and a holder. The heat transfer plate is arranged side by side with the battery cell and is thermally coupled to the battery cell and includes an edge. The holder holds the battery cell and includes a cutout section to which the heat transfer plate is fitted. The edge of the heat transfer plate includes a first engagement section that is at least one of a first recess and a first protrusion. The holder includes a second engagement section that is at least one of a second protrusion, which is fitted to the first recess, and a second recess, which is fitted to the first protrusion.

BRIEF DESCRIPTION OF THE DRAWINGS

FIGS. 7A and 7B are perspective views showing a holder of a modification.
FIG. 8 is a perspective view showing a holder and a heat transfer plate of another modification.

MODES FOR CARRYING OUT THE INVENTION

A battery module according to one embodiment will now be described. The battery module is mounted on a forklift. In the following descriptions, the terms "front", "rear", "left", "right", "up", and "down" are based on a state in which a forklift operator faces the front of the forklift.

Figure 1:
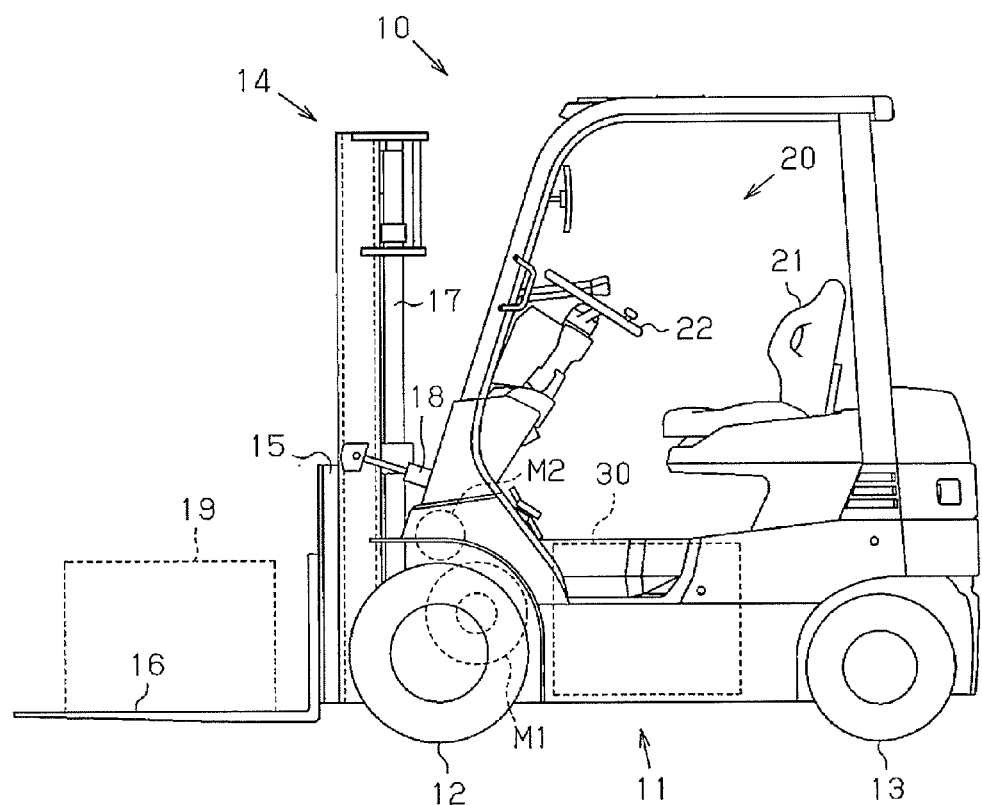
FIG. 1 is a schematic side view showing a forklift.

As shown in FIG. 1, a forklift 10 includes a vehicle body 11, drive wheels 12, which are located in the front lower section of the vehicle body 11, steered wheels 13, which are located in the rear lower section of the vehicle body 11, and a material handling device, which is located in front of the vehicle body 11. The material handling device includes a mast 14, which is arranged in front of the vehicle body 11, and a pair of right and left forks 16, which is coupled to the mast 14 by a lift bracket 15. A lift cylinder 17 is coupled to the mast 14 and driven to lift and lower the forks 16 with the lift bracket 15. A tilt cylinder 18 is coupled to the mast 14 and driven to tilt the forks 16 and the mast 14. A carried load 19 is mounted on the forks 16. The vehicle body 11 includes a drive motor M1, which functions as the driving source of the drive wheels 12, and a material handling motor M2, which functions as the driving source of the forks 16.

Further, the vehicle body 11 includes an operator cab 20 at the center. The operator cab 20 includes an operator seat 21, on which the operator (driver) sits. A steering wheel 22 is located in front of the operator seat 21. A battery pack 30 is located under the operator cab 20. The details of the battery pack 30 are given below.

Figure 2:
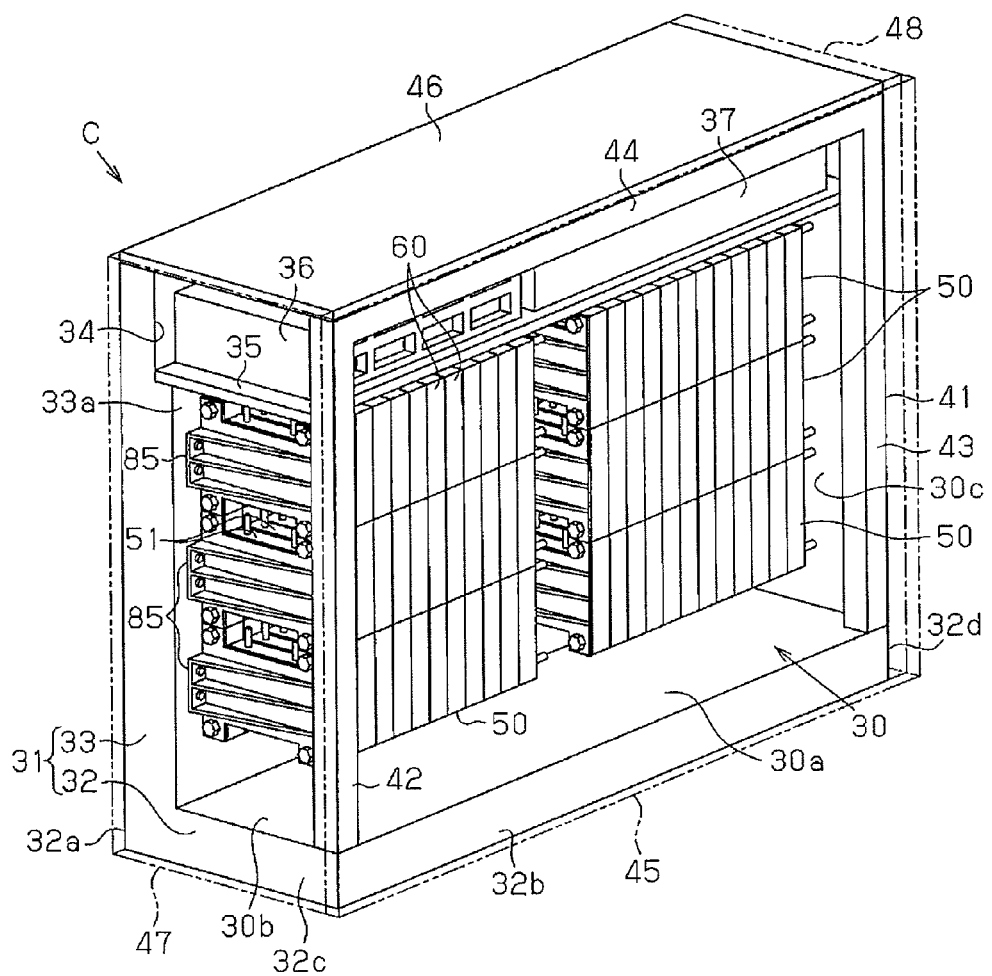
FIG. 2 is a perspective view showing a battery pack installed in the forklift of FIG. 1.

As shown in FIG. 2, the battery pack 30 is accommodated in a case C, which includes a counterweight 31, which counterbalances the carried load 19 mounted on the forks 16. The counterweight 31 includes a weight portion 32, which has the shape of a rectangular solid, and a weight body 33, which has the shape of a rectangular plate. The weight body 33 projects from a first end 32a in the transverse direction of the weight portion 32 and in the thickness direction of the weight portion 32. The weight body 33 also extends from a first end 32c to a second end 32d in the longitudinal direction of the weight portion 32. In other words, the weight portion 32 projects from the proximal end of the weight body 33 and in the thickness direction of the weight body 33. The distal end of the weight body 33 (the end opposite to the proximal end of the weight body 33) includes a cutout section 34, in which the weight body 33 is cut out in the thickness direction of the weight body 33.

A frame 41 projects from a second end 32b in the transverse direction of the weight portion 32. The frame 41 is apart from the weight body 33 and substantially has the shape of an inverted letter U. The frame 41 includes a first column 42 and a second column 43, which project from the upper surface of the weight portion 32 at the two corners on the second end 32b in the transverse direction, and a base 44, which connects the upper ends of the first column 42 and the second column 43 (the ends opposite to the ends that are connected to the weight portion 32). That is, the case C includes a front opening 30a, which is surrounded by the weight portion 32 and the frame 41, at the side that corresponds to the second end 32b in the transverse direction of the weight portion 32. The front opening 30a is closed by a lid 45, which has the shape of a rectangular plate.

The dimension of the columns 42 and 43 in the projecting direction (the dimension of the columns 42 and 43 in the longitudinal direction) is equal to the minimum dimension between the upper surface of the weight portion 32 and the distal end surface of the weight body 33. The upper surface of the frame 41 and the upper surface of the weight body 33 support a top panel 46, which closes the opening (not shown) between the weight body 33 and the frame 41. Further, the case C includes a first opening 30b at the side that corresponds to the first end 32c in the longitudinal direction of the weight portion 32. The first opening 30b is surrounded by the weight body 33, the weight portion 32, the first column 42, and the top panel 46. The case C also includes a second opening 30c at the side that corresponds to the second end 32d in the longitudinal direction of the weight portion 32. The second opening 30c is surrounded by the weight body 33, the weight portion 32, the second column 43, and the top panel 46. A first lid 47 closes the first opening 30b, and a second lid 48 closes the second opening 30c. The counterweight 31, the frame 41, the top panel 46, and the lids 45, 47 and 48 form the case C.

The weight body 33 has a surface in the thickness direction (the inner surface of the case C) that functions as an arrangement surface 33a, on which the battery modules 50 are arranged. The battery modules 50 are arranged side by side on the arrangement surface 33a. In the present embodiment, two battery lines, each of which includes three battery modules 50 arranged in the transverse direction of the weight body 33, are arranged in the longitudinal direction of the weight body 33.

The cutout section 34 forms a horizontal mount surface at a position lower than the distal end surface of the weight body 33. A mount panel 35, which is a rectangular flat plate, is fixed to the mount surface. An accommodation case 36 and a junction box 37 are located on the mount panel 35. The accommodation case 36 accommodates a controller that controls battery modules 50. The junction box 37 accommodates relays and wires.

Figure 3:
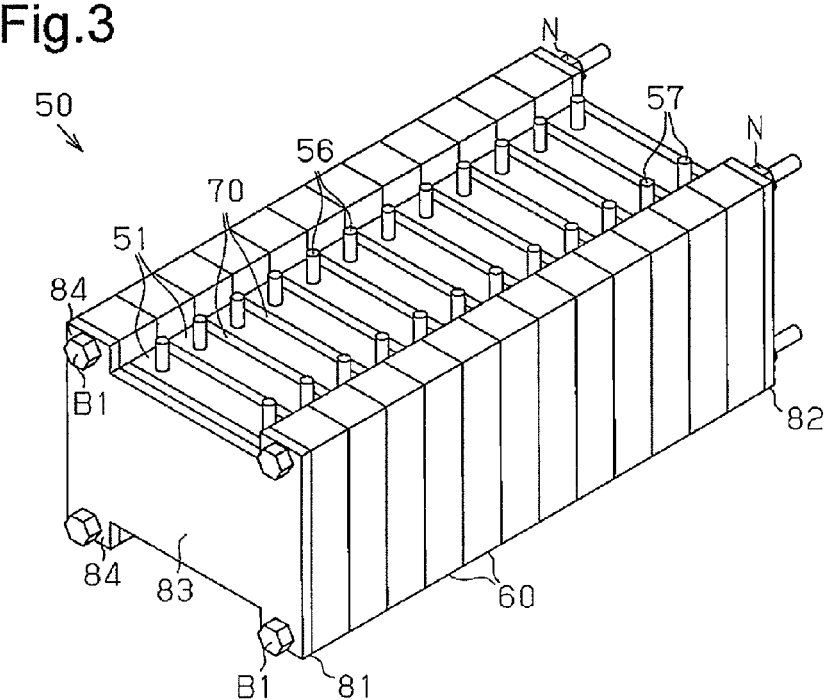
FIG. 3 is a perspective view showing a battery module of the battery pack of FIG. 2.
Figure 4:
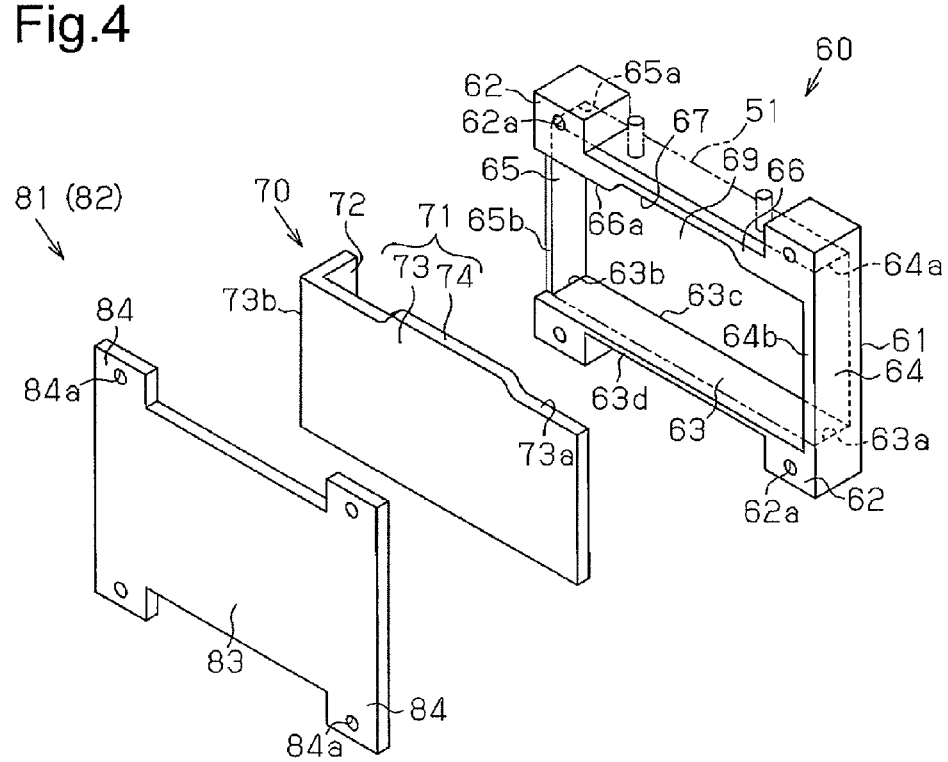
FIG. 4 is a perspective view showing the relationship of a holder, a heat transfer plate, and an end plate of the battery module of FIG. 3.

As shown in FIGS. 3 and 4, each battery module 50 includes holders 60 and rectangular batteries 51, which serve as battery cells and are held by the holders 60. The rectangular batteries 51 are arranged side by side in the thickness direction of the rectangular batteries 51. A heat transfer plate 70 is arranged between adjacent ones of the rectangular batteries 51. End plates 81 and 82 are arranged at the opposite ends of the battery module 50 in the arrangement direction of the rectangular batteries 51. Bolts B1 are inserted through the end plate 81, the holders 60, and the end plate 82 and then fastened to nuts N to assemble the battery module 50. Thus, the end plates 81 and 82 sandwich and hold the rectangular batteries 51 in the arrangement direction of the rectangular batteries 51. The end plates 81 and 82 apply pressure to the rectangular batteries 51 and the heat transfer plates 70 in the arrangement direction of the rectangular batteries 51. Thus, the end plate 81 and 82, the bolts B1, and the nuts N function as pressure application members.

As shown in FIG. 4, each holder 60 includes a holder main body 61, which has the shape of a rectangular frame, and legs 62, which have the shape of a rectangular solid. The legs 62 project from the four corners of the outer surface of the holder main body 61. Specifically, the holder main body 61 includes a first covering section 63, which has the shape of a rectangular flat plate, and a second covering section 64, which has the shape of a rectangular flat plate and extends in the thickness direction of the first covering section 63 and from a first end 63a in the longitudinal direction of the first covering section 63. The second covering section 64 extends from a first end 63c in the transverse direction of the first covering section 63 to a second end 63d in the transverse direction of the first covering section 63 (the end that faces a fourth covering section 66, which will be described below). A third covering section 65, which has the shape of a rectangular flat plate, extends in the thickness direction of the first covering section 63 and from a second end 63b in the longitudinal direction of the first covering section 63. The transverse dimension of the third covering section 65 is slightly shorter than the transverse dimension of the second covering section 64. Thus, although the third covering section 65 extends from the first end 63c in the transverse direction of the first covering section 63 toward the second end 63d in the transverse direction of the first covering section 63, the third covering section 65 does not reach the second end 63d in the transverse direction.

The second covering section 64 and the third covering section 65 include a first end 64a and a first end 65a in the longitudinal direction, respectively, which are opposite to the ends where the first covering section 63 is located. A fourth covering section 66 is located at the first ends 64a and 65a in the longitudinal direction of the second and third covering sections 64 and 65. The fourth covering section 66 extends from the first end 64b in the transverse direction of the second covering section 64 to the first end 65b in the transverse direction of the third covering section 65. The thickness direction of the fourth covering section 66, which has the shape of a plate, is the same as the transverse direction of the second covering section 64 and the transverse direction of the third covering section 65. In addition, the direction in which the fourth covering section 66 extends from the second covering section 64 to the third covering section 65 is defined as the longitudinal direction of the fourth covering section 66, and the direction perpendicular to the longitudinal direction and the thickness direction of the fourth covering section 66 is defined as the transverse direction of the fourth covering section 66. The first end 66a in the transverse direction of the fourth covering section 66 (end or edge that faces the first covering section 63) includes a recess 67 that extends in the transverse direction of the fourth covering section 66. The covering sections 63 to 66 cover a rectangular battery 51 so that the rectangular battery 51 is fixed in the holder 60.

The covering sections 63 to 66 surround a region that forms a fitting section 69 to which a heat transfer plate 70 is fitted. The heat transfer plate 70 fitted to the fitting section 69 is located adjacent to the rectangular battery 51.

The legs 62 project from the opposite ends in the longitudinal direction of each of the second covering section 64 and the third covering section 65 and in the longitudinal direction of the covering sections 64 and 65. An insertion hole 62a, through which a bolt B1 is inserted, extends through each leg 62 and in the direction extending from the first end 63c to the second end 63d in the transverse direction of the first covering section 63. Insertion of the bolts B1 into the insertion holes 62a arranges the adjacent holders 60 side by side in the axial direction of the bolts B1.

Figure 5:
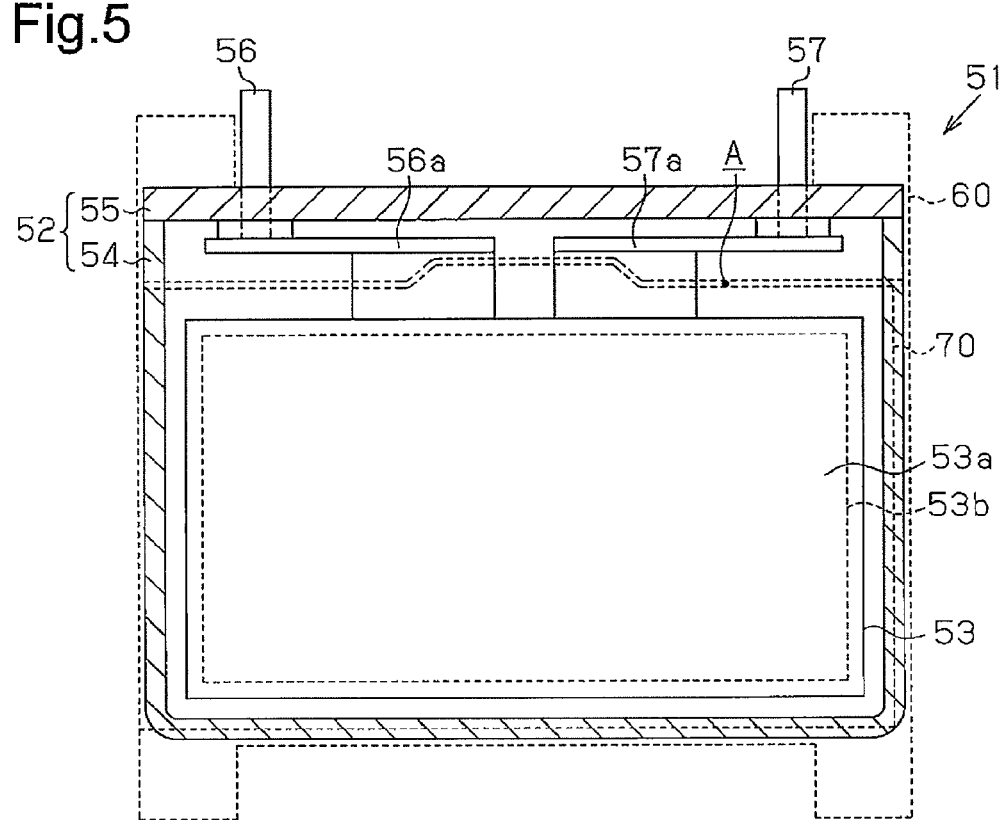
FIG. 5 is a cross-sectional view showing a rectangular battery of the battery module of FIG. 3.

As shown in FIG. 5, each rectangular battery 51 includes an electrode assembly 53 and a case 52, which accommodates the electrode assembly 53. The case 52 includes a main body 54, which accommodates the electrode assembly 53 and has the shape of a rectangular box, and a lid 55, which closes the opening of the main body 54 and has the shape of a rectangular plate. The lid 55 includes a positive terminal 56 and a negative terminal 57. The electrode assembly 53 includes a plurality of laminated electrodes 53a. Each electrode 53a includes an active material 53b. A positive conductor 56a and a negative conductor 57a electrically connect the positive terminal 56 and the negative terminal 57 to the electrode assembly 53. The positive conductor 56a and the negative conductor 57a are located in a region A between the active materials 53b and the lid 55 (wall that includes the terminals). When the rectangular battery 51 is held by a holder 60, the recess 67 of the holder 60 faces the region A.

As shown in FIG. 4, each heat transfer plate 70 includes a heat absorption section 71, which is located between the adjacent rectangular batteries 51, and a heat dissipation section 72, which extends from the heat absorption section 71 in the arrangement direction of the rectangular batteries 51. The heat absorption section 71 includes a main body 73, which has the shape of a rectangular flat plate, and a protrusion 74, which protrudes in the transverse direction of the main body 73 from a first end 73a (edge) in the transverse direction of the main body 73. The heat dissipation section 72 has the shape of a rectangular plate and extends in the thickness direction of the main body 73 from a first end 73b in the longitudinal direction of the main body 73. The heat dissipation section 72 covers the third covering section 65 of a holder 60. Thus, the heat dissipation section 72 is exposed on the side of the battery module 50 that corresponds to the third covering section 65 of the holder 60. The protrusion 74 and the recess 67 have complementary shapes so that the protrusion 74 is fitted to the recess 67. As shown in FIG. 5, the protrusion 74 faces the region A that is located between the electrode assembly 53 and the lid 55. In other words, the protrusion 74 faces the region A that is located between the electrode assembly 53 and the wall of the rectangular battery 51 that includes the terminals 56 and 57.

In the present embodiment, the fitting section 69 of the holder 60 is a cutout section. The cutout section refers to a hole that opens in the arrangement direction of the rectangular batteries 51 and in a direction that differs from the arrangement direction. In addition, the cutout section refers to a hole that is formed such that, when the battery module 50 is formed with the heat transfer plates 70 fitted to the fitting sections 69, a part of the edge surfaces, or surfaces that differ from the surfaces that face the rectangular batteries 51 or the end plates 81 and 82 of the main body 73, does not face the holder 60. In other words, the cutout section refers to a hole that is formed such that if the protrusion 74 were not formed in the heat transfer plate 70, the heat transfer plate 70 would be able to slide in a direction that intersects the arrangement direction of the rectangular batteries 51 and through the part of the hole that opens in a direction that differs from the arrangement direction of the rectangular batteries 51 when the battery module 50 is formed with the heat transfer plates 70 fitted to the fitting sections 69. In the present embodiment, the second covering section 64 extends from the first end 63c to the second end 63d in the transverse direction of the first covering section 63, but the third covering section 65, which extends from the first end 63c toward the second end 63d in the transverse direction of the first covering section 63, does not reach the second end 63d in the transverse direction. Thus, if the protrusion 74 were not formed in the heat transfer plate 70, the heat transfer plate 70 would be able to slide in the direction extending from the second covering section 64 toward the third covering section 65.

Each of the end plates 81 and 82 includes a base 83, which has the shape of a rectangular flat plate, and protrusions 84, which protrude from the four corners of the base 83 and have the shape of a rectangular flat plate. Each protrusion 84 includes an insertion hole 84a, which extends through the protrusion 84 in the thickness direction of the protrusion 84 and receives a bolt B1.

Figure 6:
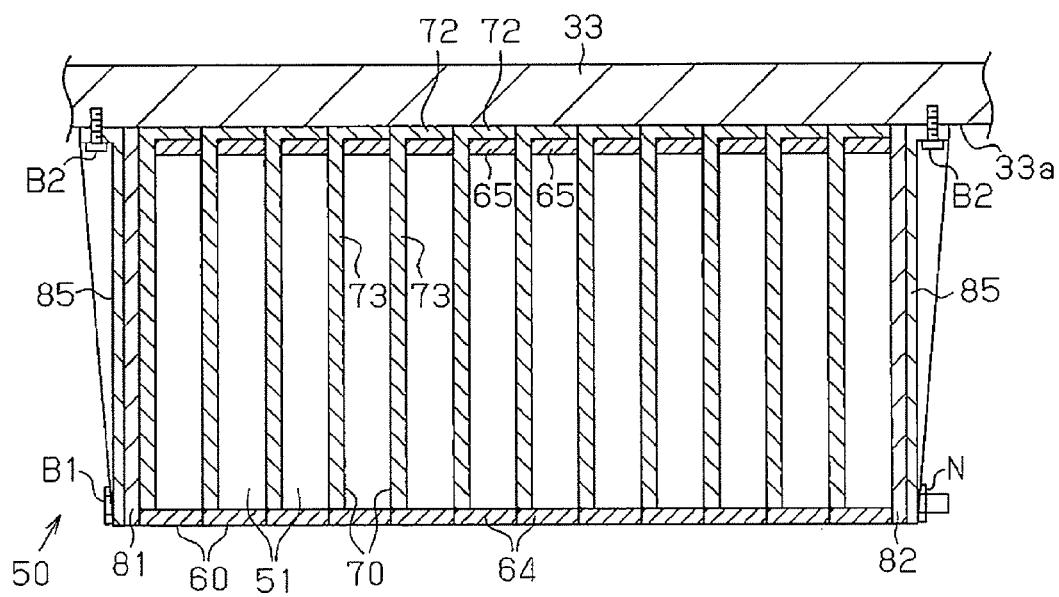
FIG. 6 is a cross-sectional view showing the battery module of FIG. 3.

As shown in FIG. 6, bolts B2 are inserted through brackets 85, which are fixed to the end plates 81 and 82, and threaded to the weight body 33. This fixes the battery module 50 to the weight body 33. The arrangement surface 33a of the weight body 33 is in contact with the heat dissipation sections 72.

Operation of the battery module 50 will now be described.

Driving of the forklift 10 vibrates the battery module 50. The covering sections 63 and 66 cover the end surfaces in the transverse direction of the main body 73 of the heat transfer plate 70, and the second covering section 64 covers the end surface of the second end in the longitudinal direction of the main body 73 that is opposite to the first end 73b in the longitudinal direction of the main body 73. However, the end surface of the first end 73b in the longitudinal direction of the main body 73 is not covered by the third covering section 65 of the holder 60 and is thus exposed from the holder 60. Thus, if the protrusion 74 were not formed in the heat transfer plate 70, the heat transfer plate 70 would be displaced in the direction extending from the second end toward the first end 73b in the longitudinal direction of the main body 73.

In the battery module 50 of the present embodiment, the protrusion 74 of the heat transfer plate 70 is fitted to the recess 67 of the holder 60. The engagement between the protrusion 74 and the recess 67 limits movement of the heat transfer plate 70 in the longitudinal direction of the main body 73. In the present embodiment, the contact of the weight body 33 with the end surface of the first end 73b in the longitudinal direction of the main body 73 and the heat dissipation section 72 allows the weight body 33 to limit movement of the heat transfer plate 70. If the protrusion 74 and the recess 67 were not formed, the holder 60 would not limit displacement of the heat transfer plate 70 in the longitudinal direction of the main body 73, and thus the heat transfer plate 70 might press the weight body 33 and separate the battery module 50 from the weight body 33. Limitation of displacement of the heat transfer plate 70 relative to the holder 60 restrains separation of the battery module 50 from the weight body 33.

During charging of the rectangular battery 51, supply of electrons into the electrode assembly 53 (electrodes 53a) expands the electrode assembly 53. Repeating expansion of the electrode assembly 53 caused by repeating charging of the rectangular battery 51 may widen the distances between the electrodes 53a or distort the electrodes 53a, which may increase the resistance of the rectangular battery 51. Increase in the resistance of the rectangular battery 51 increases Joule loss. For this reason, the heat transfer plate 70 applies pressure to the electrode assembly 53 to limit distortion of the electrodes 53a.

In the present embodiment, the recess 67 faces the region A, and thus the protrusion 74 faces the region A. Although the positive conductor 56a and the negative conductor 57a are located in the region A, there is a clearance between the accommodation case 52 and the conductors 56a and 57a. Thus, the conductors 56a and 57a are unlikely to be influenced by application of the pressure.

The above described embodiment has the following advantages.

(1) The insertion holes 62a in the legs 62 allow the holders 60 to be positioned relative to one another. Each holder 60 includes the recess 67, to which the protrusion 74 of the associated heat transfer plate 70 is fitted. When the protrusion 74 is fitted to the recess 67, the protrusion 74 and the recess 67 are engaged with each other, thereby limiting displacement of the heat transfer plate 70. The fitting section (cutout section) 69 of the holder 60 opens in a first direction in which the heat transfer plate 70 faces the rectangular battery 51 and in a second direction that intersects the first direction. The protrusion 74 and the recess 67 are engaged with each other to limit displacement of the heat transfer plate 70 in the second direction relative to the holder 60. This restrains separation of the heat transfer plate 70 from the battery module 50, allowing for efficient dissipation of the heat of the rectangular battery 51.

(2) The holder 60 is formed such that the covering sections 63 to 66 fix the rectangular battery 51. Thus, the rectangular batteries 51 that are held by the respective holders 60 can be arranged side by side. The positioning of the holders 60 achieves the positioning of the rectangular batteries 51.

(3) Each heat transfer plate 70 includes a heat absorption section 71, which is sandwiched by rectangular batteries 51, and a heat dissipation section 72, which extends from an end of the heat absorption section 71. The heat absorption section 71 absorbs heat from the rectangular batteries 51, and the heat dissipation section 72 dissipates the heat. This cools the rectangular batteries 51 efficiently. In particular, in the present embodiment, the heat dissipation section 72 is in contact with the weight body 33 so that the heat is dissipated to the weight body 33 through the heat dissipation section 72. This increases the efficiency in cooling of the rectangular batteries 51.

(4) The recess 67 is formed in a part that faces the region A, and thus the protrusion 74 faces the region A. Although the positive conductor 56a and the negative conductor 57a are located in the region A, the conductors 56a and 57a are unlikely to be influenced by application pressure. Thus, the electrodes 53a (electrode assembly 53) of the rectangular battery 51 receive pressure in a suitable manner.

The present embodiment may be modified as follows.

As shown in FIGS. 7A and 7B, the holders 60 may include fitting protrusions 91 and fitting recesses 92 that are fitted to each other. In this modification, columnar members 90, which have the shape of a quadratic prism, are formed on a second end 66b in the transverse direction of the fourth covering section 66 of the holder 60. The axial direction of the columnar members 90 is the same as the thickness direction of the fourth covering section 66. Each columnar member 90 includes a first end 90a in the axial direction, which includes a tubular fitting protrusion 91 extending in the axial direction of the columnar member 90. A second end 90b in the axial direction of the columnar member 90 includes a cylindrical fitting recess 92 extending in the axial direction of the columnar member 90. When the holders 60 are arranged side by side, the fitting protrusion 91 of one of the adjacent holders 60 is inserted in the fitting recess 92 of the other. This positions the holders 60.

As shown in FIG. 8, each heat transfer plate 70 may include a recess 75, and each holder 60 may include a protrusion 68 that is fitted to the recess 75. Alternatively, each of the heat transfer plates 70 and the holders 60 may include both of a protrusion and a recess. In other words, any structure may be employed as long as the heat transfer plate 70 includes a first engagement section that is at least one of a first recess and a first protrusion, and the holder 60 includes a second engagement section that is at least one of a second protrusion that is fitted to the first recess and a second recess that is fitted to the first protrusion.

The main body 73 of the heat transfer plate 70 may include a projection that projects in the thickness direction of the main body 73, and the holder 60 may include an insertion section that receives the projection.

The holder 60 does not have to hold the rectangular battery 51 with the holder main body 61. For example, a planar member, which has the shape of a plate (e.g., the shape of the end plates 81 and 82 in the illustrated embodiment), may be used as a holder, and the rectangular battery 51 may be held by sandwiching the rectangular battery 51 with two planar members. In this case, the planar members include insertion holes that receive bolts B1, and the rectangular battery 51 is held by adjusting the distance between the two planar members using the bolts B1. The planar members include projections that project in the thickness direction of the planar members. The projections are inserted into through holes formed in the heat transfer plates 70, thereby limiting movement of the heat transfer plates 70.

The heat transfer plates 70 and the rectangular batteries 51 do not have to receive pressure.

The heat dissipation sections 72 do not have to contact the counterweight 31.

In the illustrated embodiment, laminated batteries and cylindrical batteries may be used as battery cells. In this case, the shape of the holders 60 is changed according to the shape of the battery cells.

What is claimed is:
1. A battery module comprising:
a battery cell;
a heat transfer plate that is arranged side by side with the battery cell in a side by side arrangement direction, the heat transfer plate including a heat absorption section, which absorbs heat from the battery cell and extends in a longitudinal direction of the battery cell transverse to the side by side arrangement direction to thermally couple the heat transfer plate to the battery cell, the heat absorption section including an outer peripheral edge having a first engagement section that is at least one of a first recess and a first protrusion; and
a holder that includes a plurality of covering sections that cover and fix the battery cell in the holder, the plurality of covering sections surrounding a cutout section that receives the at least one of the first recess and the first protrusion of the outer peripheral edge in the holder such that displacement of the heat transfer plate in the longitudinal direction is limited, wherein
the holder includes a second engagement section that is at least one of a second protrusion, which is fitted to the first recess, and a second recess, which is fitted to the first protrusion, and
the first engagement section and the second engagement section are fitted to each other in a fitting direction that is transverse to both the side by side arrangement direction and the longitudinal direction.

2. The battery module according to claim 1, wherein
the heat transfer plate includes a heat dissipation section, which dissipates the heat, and
the heat dissipation section contacts a counterweight of a case, which accommodates the battery module.

3. The battery module according to claim 1, wherein
the heat transfer plate fitted to the cutout section is adjacent to the battery cell covered by the covering sections.

4. The battery module according to claim 1, wherein
the cutout section is a hole in the holder.

5. A battery module comprising:
a plurality of battery cells that are arranged side by side;
a plurality of heat transfer plates, each of the plurality of heat transfer plates being arranged between adjacent ones of the plurality of battery cells in a side by side arrangement direction, and including a heat absorption section, which absorbs heat from the corresponding battery cell and extends in a longitudinal direction of the corresponding battery cell transverse to the side by side arrangement direction to thermally couple the heat transfer plate to the corresponding battery cell, the heat absorption section including an outer peripheral edge having a first engagement section that is at least one of a first recess and a first protrusion; and
a plurality of holders, each of the plurality of holders including a plurality of covering sections that cover and fix one of the plurality of battery cells in the respective holder, each of the plurality of covering sections of each of the plurality of holders surrounding a cutout section that receives the at least one of the first recess and the first protrusion of the outer peripheral edge of the heat transfer plate in the holder such that displacement of the heat transfer plate in the longitudinal direction is limited, wherein the plurality of battery cells and the plurality of heat transfer plates are held in a pressed state in the arrangement direction of the plurality of battery cells,
each of the plurality of holders includes a second engagement section that is at least one of a second protrusion, which is fitted to the first recess, and a second recess, which is fitted to the first protrusion, and
each of the first engagement sections and corresponding one of the second engagement sections are fitted to each other in a fitting direction transverse to both the side by side arrangement direction and the longitudinal direction.

6. The battery module according to claim 5, wherein
each of the plurality of heat transfer plates includes a heat dissipation section, which dissipates the heat, and
the heat dissipation section contacts a counterweight of a case, which accommodates the battery module.

7. The battery module according to claim 5, wherein each of the plurality of heat transfer plates fitted to each of the cutout sections of each of the plurality of holders is adjacent to each of the plurality of battery cell covered by the covering sections of each of the plurality of holders.

8. The battery module according to claim 5, wherein
the cutout section is a hole in each of the plurality of holders.

* * * * *